(12) United States Patent
Lo

(10) Patent No.: US 7,440,363 B2
(45) Date of Patent: *Oct. 21, 2008

(54) METHOD AND APPARATUS FOR SLIP PROTECTION OF DVD-RAM DRIVE'S SEEK CONTROL

(75) Inventor: Chen-Hsing Lo, Taipei (TW)

(73) Assignee: ALi Corporation, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/896,181

(22) Filed: Aug. 30, 2007

(65) Prior Publication Data

US 2007/0297300 A1 Dec. 27, 2007

Related U.S. Application Data

(63) Continuation of application No. 10/857,886, filed on Jun. 2, 2004, now Pat. No. 7,280,447.

(30) Foreign Application Priority Data

Dec. 16, 2003 (TW) ............................. 92135485 A

(51) Int. Cl.
G11B 7/00 (2006.01)
(52) U.S. Cl. ............... 369/44.32; 369/44.28; 369/44.29
(58) Field of Classification Search ............. 369/44.28, 369/44.29, 44.32, 44.25, 53.28
See application file for complete search history.

(56) References Cited

U.S. PATENT DOCUMENTS

| 5,050,146 | A | * | 9/1991 | Richgels et al. | 369/30.15 |
|---|---|---|---|---|---|
| 5,307,333 | A | * | 4/1994 | Ikeda et al. | 369/44.28 |
| 5,623,464 | A | * | 4/1997 | Tani | 369/44.28 |
| 5,631,890 | A | * | 5/1997 | Ikeda et al. | 369/53.35 |
| 5,760,991 | A | * | 6/1998 | Semba | 360/78.06 |
| 5,870,356 | A | * | 2/1999 | Ikeda | 369/30.15 |
| 6,925,037 | B2 | * | 8/2005 | Kishimoto et al. | 369/44.29 |
| 7,280,447 | B2 | * | 10/2007 | Lo | 369/44.29 |

* cited by examiner

*Primary Examiner*—Thang V Tran
(74) *Attorney, Agent, or Firm*—Troxell Law Office, PLLC

(57) ABSTRACT

The present invention is provides a method and apparatus for slip protection of DVD-RAM drive's seek control, comprising a slip end velocity controller, a re-seek controller, and a slip detector. Among them, the slip end velocity controller is used for providing a first control signal to direct a driver to control the slip end velocity of the optical head while seeking. The re-seek controller is capable of providing a second control signal to the seek controller for directing the seek controller to control the driver driving the optical head for re-seeking. The slip detector is used for receiving the TE signal sent from the preamplifier to determine if the optical head is slipping and to switch the input signal of the driver.

9 Claims, 5 Drawing Sheets

US 7,440,363 B2

METHOD AND APPARATUS FOR SLIP PROTECTION OF DVD-RAM DRIVE'S SEEK CONTROL

This application is a Continuation of currently pending application U.S. Ser. No. 10/857,886, entitled "METHOD AND APPARATUS FOR SLIP PROTECTION OF DVD-RAM DRIVE'S SEEK CONTROL" and filed on Jun. 4, 2004.

FIELD OF THE INVENTION

The present invention relates to a method and apparatus for slip protection of DVD-RAM drive's seek control, and more particularly, to a method and apparatus applies track-error signals on a DVD-RAM drive for slip protection while the DVD-RAM is performing a seeking operation.

BACKGROUND OF THE INVENTION

When reading information from a DVD disc, the optical head of the DVD drive has to move accordingly in order to read the data on the different tracks of the DVD disc. Hence, the optical head of the DVD drive has to seek the tracks so that the laser beam emitted from the optical head of the DVD drive can move along different tracks and read the data successfully. In a typical disc, such as CD, DVD-ROM, and etc., data are only written on the grooves, while data can be written on both the grooves and the lands of a DVD-RAM disc.

Since data can be written both on the grooves and the lands of a DVD-RAM disc, the frequency of the mirroring signal (MIRR) projecting the tracks is twice the frequency of the MIRR of a CD or a DVD-ROM drive. Therefore, while a DVD-RAM drive is seeking the tracks, the frequency of the MIRR is twice the frequency of the track-error-zero-cross (TEZC) signal. Therefore, unlike the CD drive or the DVD-RAM drive, the DVD-RAM drive cannot utilize both the MIRR and the TEZC signals simultaneously to determine the direction of track-seeking and to provide the hysteresis protection while slipping.

Please refer to FIG. 1, which is a schematic diagram depicting the seeking architecture of a conventional DVD-RAM drive. In this seeking architecture 100, the seek controller 110 and the track controller 120 are used to receive a plurality of signals so as to direct the driver 130 to control the motion of the optical head 140. The plural signals include the speed error signal 151, the TEZC signal 153, the MIRR signal 157, and the track-error (TE) signal 159. The seek controller 110 controls the seeking of the optical head 140 according to the speed error signal 151, the TEZC signal 153, and the MIRR 157, while the track controller 120 controls the tracking of the optical head 140 according to the TE signal 159.

However, although the seek controller 110 can control the seeking of the optical head 140 according to the speed error signal 151, the TEZC signal 153, and the MIRR 157, but because the frequency of the MIRR 157 is twice the frequency of the TEZC signal 153, the seek controller 110 can not utilize the MIRR signal 157 and the TEZC signal 153 simultaneously for determining the direction of track-seeking and providing the hysteresis protection while slipping.

Accordingly, a method and apparatus for slip protection of DVD-RAM drive's seek control that is capable of controlling the motion of slipping and thus effectively stopping the slipping is surely desired.

SUMMARY OF THE INVENTION

The primary object of the present invention is to provide an apparatus for slip protection of DVD-RAM drive's seek control, comprising a slip end velocity controller, a re-seek controller, and a slip detector. Among them, the slip end velocity controller is used for providing a first control signal to direct a driver to control the slip end velocity of the optical head while seeking. The re-seek controller is capable of providing a second control signal to the seek controller for directing the seek controller to control the driver driving the optical head for re-seeking. The slip detector is used for receiving the TE signal sent from the preamplifier to determine if the optical head is slipping and to switch the input signal of the driver.

Another object of the present invention is to provide a method for slip protection of DVD-RAM drive's seek control, comprising the step of: detecting the slipping of the optical head at the end of seeking; if slipping, the optical head is directed to re-seek, if not, the seeking stops.

In a preferred embodiment of the present invention, an evaluation is made to determine if the end velocity of slipping of the optical head is smaller than a low speed limit of slipping when slipping occurs. If the end velocity of slipping of the optical head is smaller than the low speed limit, the optical head will re-seek the track. If the end velocity of slipping of the optical head is greater than the low speed limit, the speed of the optical head will be reduced. After reducing the speed, the end velocity of the optical head will be compared to the low speed limit of slipping. After the optical head is directed to re-seek, the detection of slipping is being performed.

To determine if the slipping occurs, the oscillation frequency of the TE signal in a unit time is detected to determine if the slipping occurs. It is considered to be slipping if the oscillation frequency exceeds a threshold, while it is not if the frequency is below the threshold. In the preferred embodiment of the present invention, the occurrence of the slipping of the optical head is determined by counting the number of the first- and the second-half of the cycles of the TE signal in a unit time with a counter. Meanwhile, the control of the end velocity of the slipping of the optical head is proceeded with the band-band control.

In summary, the present invention provides a method and apparatus for slip protection of DVD-RAM drive's seek control capable of controlling the motion of slipping and thus effectively stopping the slipping when slipping occurs.

DESCRIPTION OF THE PREFERRED EMBODIMENT

Figure 1:
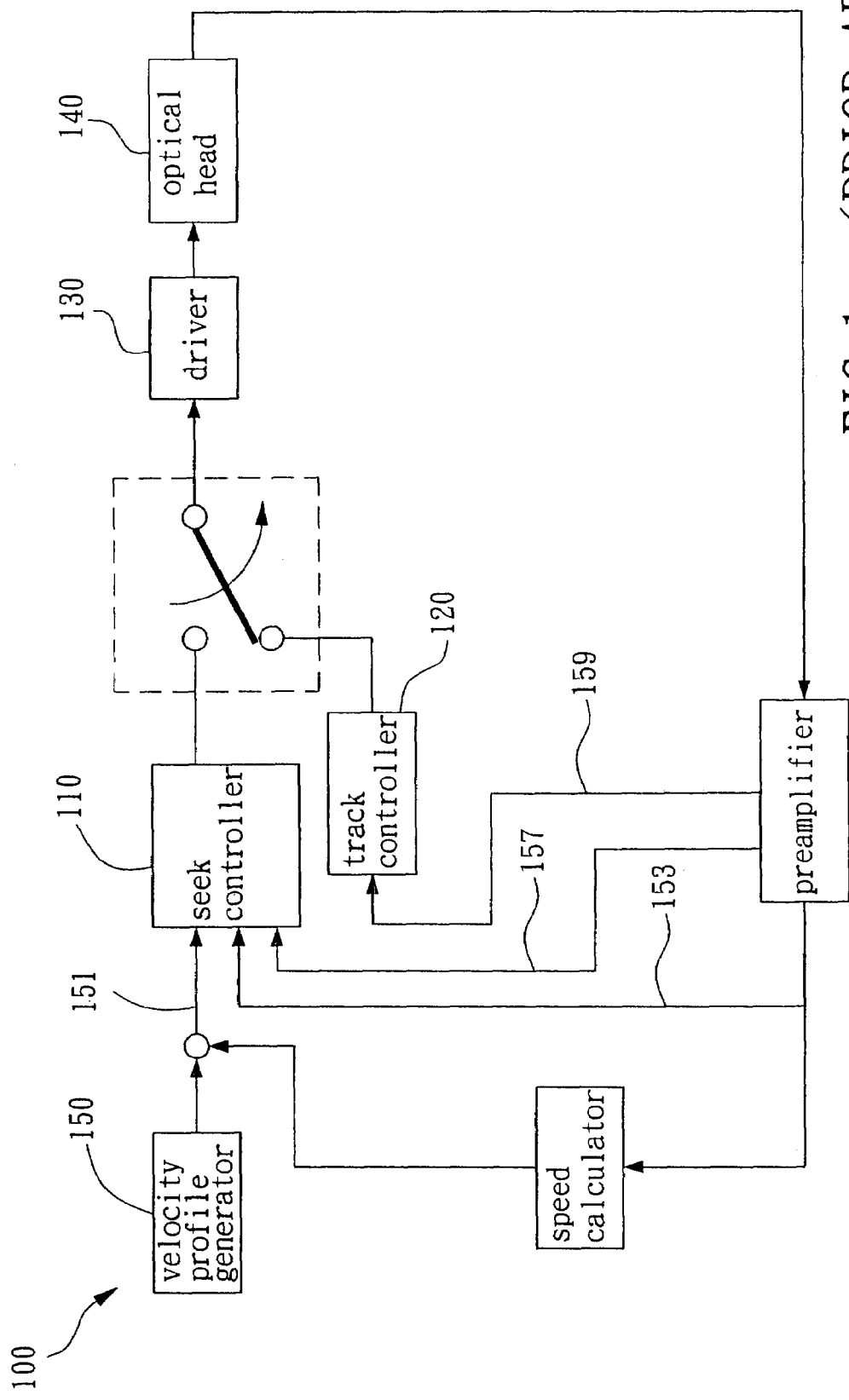
FIG. 1 is a schematic diagram depicting a conventional architecture of seek-control for a DVD-RAM drive.
Figure 2:
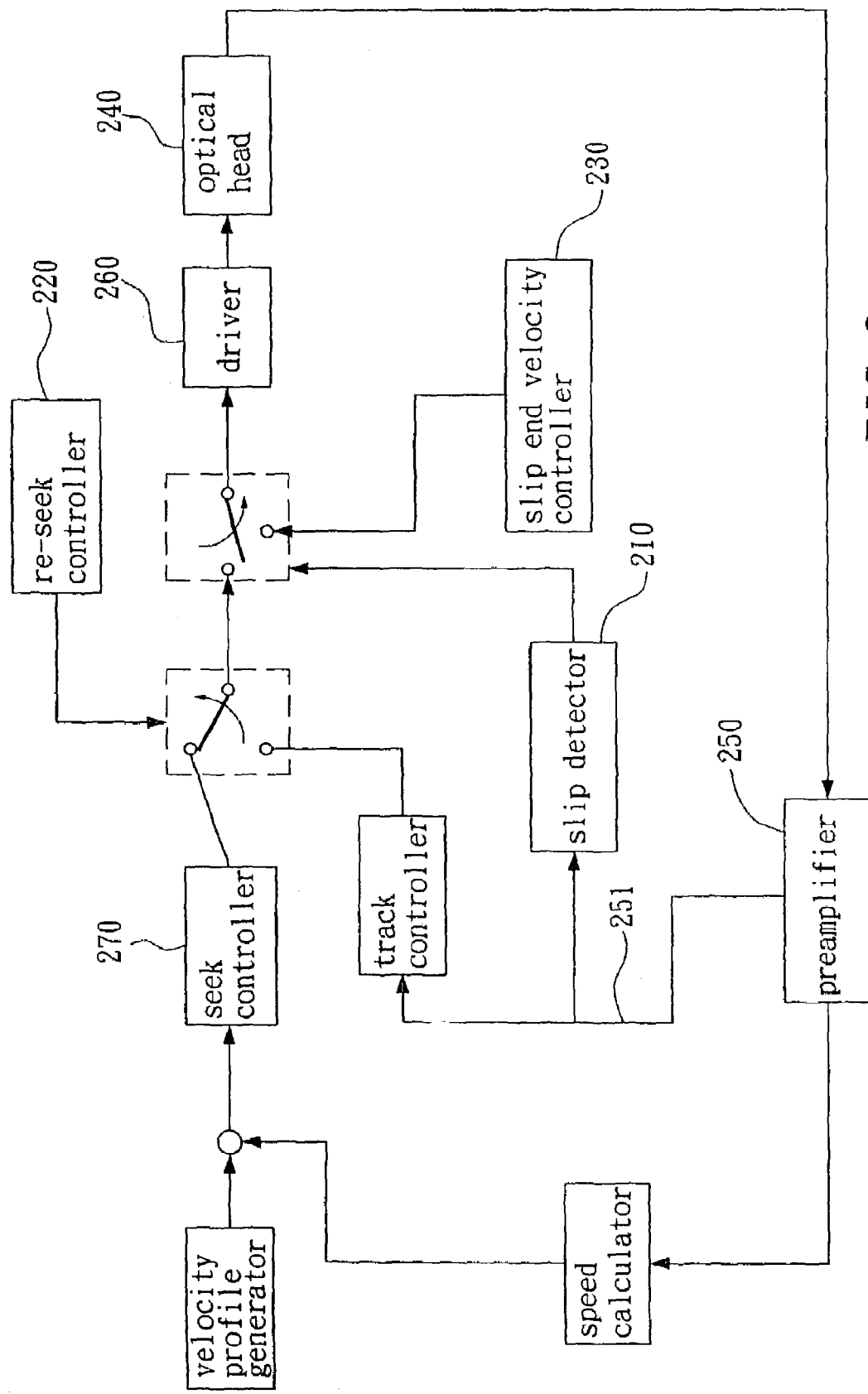
FIG. 2 is a schematic diagram showing an apparatus for slip protection of DVD-RAM drive's seek control according to a preferred embodiment of the present invention.

To make the esteemed review committee can further understand and recognize the present invention, a detailed description in accordance with several accompanying diagrams are presented as following:

Please refer to FIG. 2, which is a schematic diagram showing an apparatus for slip protection of DVD-RAM drive's seek control according to a preferred embodiment of the present invention. The slip protection apparatus comprises a slip detector 210, a re-seek controller 220, and a slip end velocity controller 230.

Figure 3:
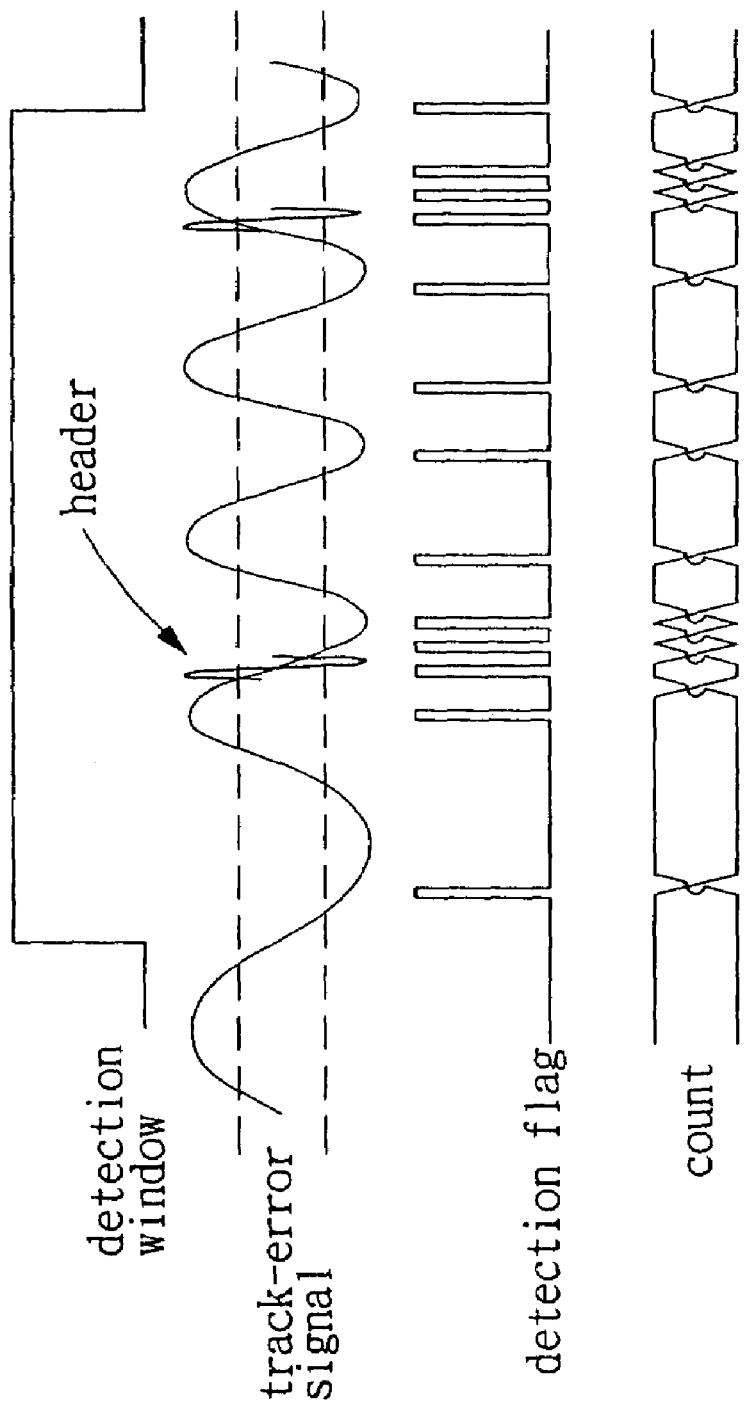
FIG. 3 is a schematic drawing of the waveforms showing how the TE signal is being used by the slip detector for determining the status of the optical head according to a preferred embodiment of the present invention.

To determine the occurrences of slipping of the optical head 240 of the DVD-RAM drive after seeking, the slip detector 210 utilizes the TE signal 251 sent from the preamplifier 250 to detect the occurrences of slipping. Please also refer to FIG. 3, which 3 is a schematic drawing of the waveforms showing how the TE signal is being used by the slip detector for determining the status of the optical head according to a preferred embodiment of the present invention. Since the tracks of the DVD-RAM disc used by the DVD-RAM drive has embossed data at the header field of each sector, its reflectivity differs from that of the writable area while the tracks are also staggered with the writable area. Therefore, the waveform of the TE signal generated while the optical head 240 is reading the DVD-RAM disc will present a high frequency signal corresponding to the header fields. Hence, while the optical head 240 is seeking the tracks on the DVD-RAM disc, slipping will occur after the seeking because of the influence of the noise on TE signal waveform. The slip detector 210 of the present invention determines the occurrences of slipping of the optical head 240 according to the oscillation frequency of the TE signal in a unit time of the detection window. In a preferred embodiment of the present invention, the occurrence of slipping of the optical head 240 is determined by counting the detection flags corresponding to the first-half and the second-half cycles of the TE signal in a detection window. Slipping is determined if the number of the first-half cycle of the TE signal is more than the second-half cycle in this detection window, otherwise is not.

After the slip detector 210 detects the occurrence of the slipping after seeking, it will provide new seeking parameters through re-seek controller 220 and switch on either the seek controller 270 for providing control signals or the slip end velocity controller 230 for providing control signals so as to direct the driver 260 to control the motion of the optical head 240. Therefore, when the slipping occurs at the end of seeking, the optical head 240 can be locked and parked in a low speed.

Figure 4:
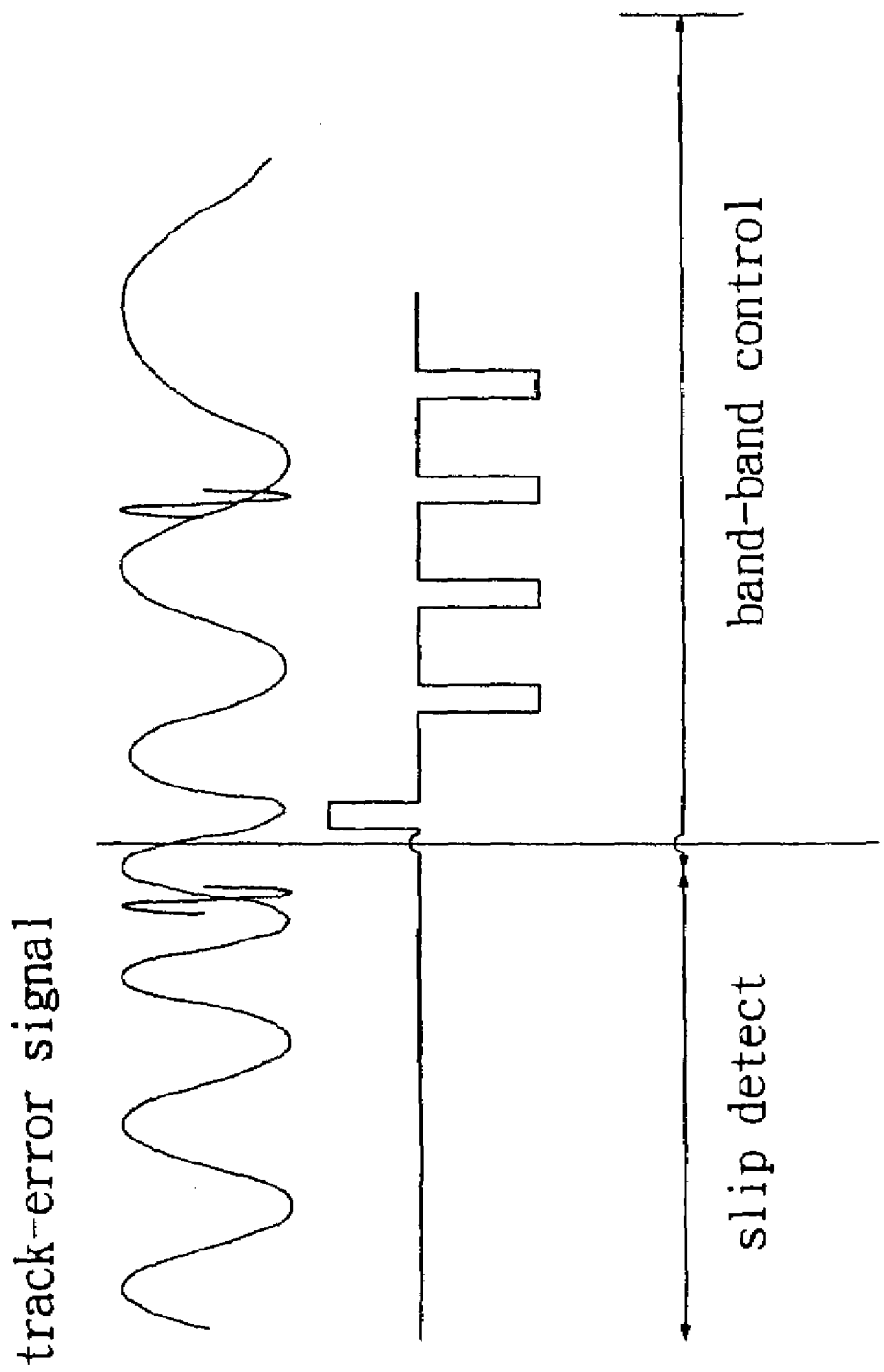
FIG. 4 is a schematic drawing of the waveforms showing how the slip end velocity controller controls the optical head.

The slip end velocity controller 230 controls the optical head 240 with a band-band control. Please refer to FIG. 4, which is a schematic drawing of the waveforms showing how the slip end velocity controller 230 controls the optical head 240. While the slip detector 210 detects the occurrence of slipping of the optical head 240 after seeking, the slip end velocity controller 230 will first direct the driver 260 to perform a band-band control to the optical head 240. If, instead of reducing the speed, the end velocity of slipping increases after the band-band control, the direction of the band-band control is considered in the opposite direction so a band-band control in the other direction will be performed.

Therefore, when the slip end velocity of the optical head 240 is controlled below the low speed limit, the re-seek controller 220 can direct the driver 260 to control the optical head 240 to re-seek so that the optical head 240 can be parked and locked in a low speed when slipping occurs after seeking.

Figure 5:
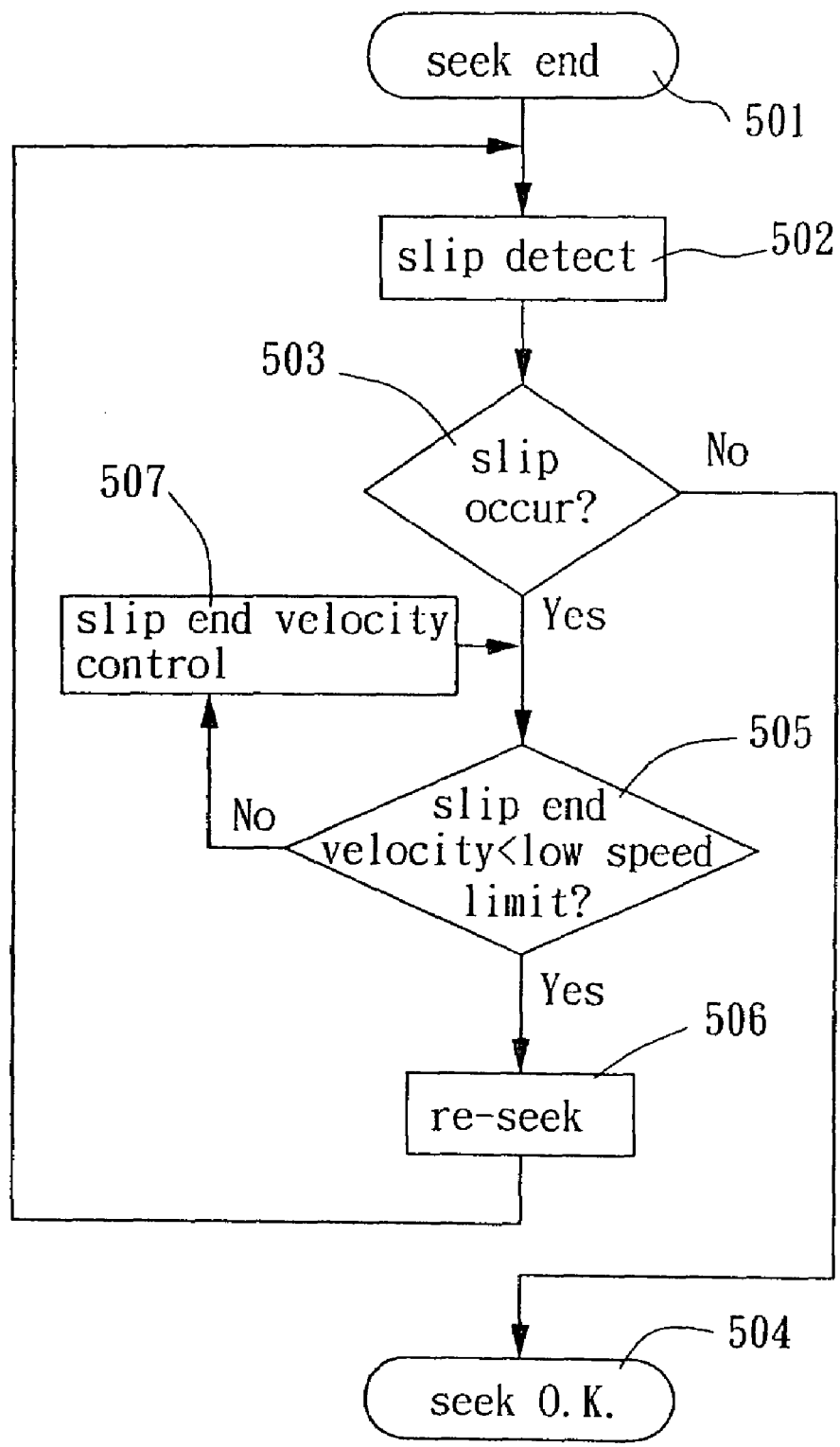
FIG. 5 is a flow chart depicting the operation of the apparatus for slip protection of DVD-RAM drive's seek control according to a preferred embodiment of the present invention.

Please refer to FIG. 2 and FIG. 5, where FIG. 5 is a flow chart depicting the operation of the apparatus for slip protection of DVD-RAM drive's seek control according to a preferred embodiment of the present invention. Flow begins at block 501 where a seeking is finishing. Flow then proceeds to block 502. At block 502, the slip detector 210 detects the TE signal 251 sent from the preamplifier 250. Flow then proceeds to decision clock 503. At decision block 503, an evaluation is made to determine if the occurrence of the slipping of the optical head 240 according to the number of the first-half and the second-half cycles of the TE signal 251 in the detection window. If no slipping occurs, then flow is directed to block 504 and the flow ends. If yes, then flow proceeds to decision block 505.

At decision block 505, an evaluation is made to determine if the slip end velocity 240 of the optical head 240 is smaller than a low speed limit (defined by the user). If yes, then flow proceeds to block 506. If no, then flow proceeds to block 507. At block 506, the re-seek controller 220 will provide the new seeking parameters and switching signal to activate the seek controller 270 again for directing the driver 260 to provide a control force to drive the optical head 240 to re-seek. Flow then proceeds to block 502. At block 507, slip end velocity controller 230 directs the driver 260 to reduce the slip end velocity of the optical head 240. Flow then is redirected to decision block 503.

Therefore, the slip protection for DVD-RAM drive is feasible with the above-mentioned embodiment and procedure.

In summary, the present invention provides a method and apparatus for slip protection of DVD-RAM drive's seek control capable of using the TE signals detected by a slip detector to determine if the slipping occurs at the end of a seeking operation without the use of the MIRR signals, and using a re-seek controller to direct the optical head to re-seek when the slip end velocity thereof is lower than a low- speed limit such that the optical head can be locked and parked. Therefore, the slipping motion can be controlled effectively and eventually stopped when the slipping of the optical head occurs after seeking.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An apparatus for slip protection of disk drive's seeking control, comprising:
   a slip detector, receiving a tracking error (TE) signal and using the same for detecting the occurrence of slipping during the seeking control; and
   a re-seek controller couple to the slip detector and a seek controller for providing a control signal for a seek controller so as to direct the seek controller to perform a re-seeking control when the slipping occurred and a slip end velocity is smaller than a low speed limit.

2. The apparatus of claim 1, further comprising a slip end velocity controller, capable of controlling the slip end velocity when slipping occurred.

3. The apparatus of claim 1, wherein the occurrence of slipping is detected by the slip detector when the oscillation frequency of the TE signal in a unit time exceeds a threshold.

4. The apparatus of claim 3, wherein a counter is used for counting the number of the first-half and the second-half cycles of the TE signal in the unit time so as to detect the occurrence of slipping of the optical head.

5. A method for slip protection of disc drive's seek control, comprising the step of:
   detecting the occurrences of slipping during the seek control;
   determining if the slip end velocity of the slipping is smaller than low speed limit when the slipping occurred; and
   performing a re-seek control when the slipping occurred and the slip end velocity of the slipping is smaller than low speed limit.

6. The method of claim 5, further comprising the step of:
   if the slip end velocity is not smaller than low speed limit, repeat the determining step until the slip end velocity is smaller than low speed limit.

7. The method of claim 6, further comprising the step of:
   if the slip end velocity is not smaller than low speed limit, the slip end velocity is reduced.

8. The method of claim 7, wherein the slip end velocity is controlled with a band-band control.

9. The method of claim 5, further comprising the step of:
   detecting the occurrences of slipping after the re-seek control.

* * * * *